United States Patent [19]
Rinkewich

[11] Patent Number: 5,427,350
[45] Date of Patent: Jun. 27, 1995

[54] ELECTRICALLY-OPERATED CONTROL VALVE AND WATER DISTRIBUTION SYSTEM INCLUDING SAME

[76] Inventor: Isaac Rinkewich, 4822 Garden View Ter., Hightstown, N.J. 08520

[21] Appl. No.: 251,767

[22] Filed: May 31, 1994

[51] Int. Cl.⁶ .................... F16K 31/04; F16K 31/46
[52] U.S. Cl. .................... 251/30.01; 251/31; 251/129.04; 251/129.12; 137/625.22; 137/625.23
[58] Field of Search ............ 251/30.01, 31, 129.04, 251/30.02, 129.11, 129.12; 137/625.21, 625.22, 625.23, 625.65, 624.2, 61

[56] References Cited
U.S. PATENT DOCUMENTS

| | | |
|---|---|---|
| 3,865,138 | 2/1975 | Jones . |
| 3,921,667 | 11/1975 | Corliss et al. . |
| 4,023,585 | 5/1977 | VandenBurg . |
| 4,156,437 | 5/1979 | Chivens et al. . |
| 4,592,505 | 6/1986 | Bruninga et al. . |
| 4,790,514 | 12/1988 | Marks .......................... 251/129.11 X |
| 4,794,314 | 12/1988 | Janu et al. ...................... 251/129.12 X |
| 4,811,221 | 3/1989 | Sturman et al. . |
| 4,838,310 | 6/1989 | Scott et al. .................. 251/129.04 X |
| 4,852,802 | 8/1989 | Iggulden et al. .............. 137/78.3 X |
| 4,883,823 | 11/1989 | Perry, Jr. et al. .................... 518/702 |
| 5,040,569 | 8/1990 | Nogami et al. ............ 251/129.13 X |

Primary Examiner—Martin P. Schwadron
Assistant Examiner—Kevin L. Lee
Attorney, Agent, or Firm—Benjamin J. Barish

[57] ABSTRACT

An electrically-operated control valve includes a rotor rotatably mounted to a first position connecting a fluid inlet port to a fluid outlet port, or a second position disconnecting the fluid inlet port from the fluid outlet port; a battery-operated electrical rotary motor for rotating the rotor; and limit switches for deenergizing the electrical motor when the rotor arrives in either the first or second positions. The electrical motor is coupled to the rotor by a speed-reducing, torque-increasing transmission such that very little electrical power is required to operate the motor, thereby enabling the control valve to be used as a remotely-controlled pilot valve for controlling a water irrigation system.

16 Claims, 5 Drawing Sheets

ELECTRICALLY-OPERATED CONTROL VALVE AND WATER DISTRIBUTION SYSTEM INCLUDING SAME

FIELD AND BACKGROUND OF THE INVENTION

The present invention relates to an electrically-operated control valve, and also to a water distribution system in which the control valve serves as a pilot valve for controlling the system. The invention is particularly useful in a battery-operated, wireless, remotely-controlled water irrigation system, and is therefore described below with respect to such an application.

Pilot valves used in remotely-controlled water irrigation systems are generally actuated by an electrical solenoid that lifts and lowers a metallic plunger to open and close fluid passages in the pilot valve. However, the conventional solenoid usually requires at least 24 volts and draws about 0.1–1.2 amperes of current. Such solenoids are therefore not suitable for battery operation; but if operated by batteries, the batteries generally have to be relatively large or frequently replaced.

OBJECTS AND BRIEF SUMMARY OF THE INVENTION

An object of the present invention is to provide a novel electrically-operated control valve which require considerably less power to operate the valve, and which therefore may be operated by batteries having long useful lives in the order of years.

Another object of the invention is to provide a water distribution system, such that as a water irrigation system, in which the electrically-operated control valve serves as a pilot valve for controlling the system.

According to the present invention, there is provided an electrically-operated control valve, comprising: a valve housing having a fluid inlet port, a control port, and a venting port; a rotor formed with a passageway therethrough rotatably mounted within the housing to a first position connecting the control port to the inlet port via the passageway, or to a second position connecting the control port to the venting port; an electrical rotary motor for rotating the rotor; a rechargeable battery for energizing the electrical motor; a rotary position sensor for sensing the position of the rotor and for deenergizing the electrical motor when the rotor arrives in either the first position or second position; and a charging device for recharging the battery.

According to further features in the described preferred embodiment, the electrical motor is coupled to the rotor via a speed-reducing, torque-increasing transmission. The rotary position sensor includes an actuator element carried by the rotor so as to rotate therewith, and a plurality of sensor members fixed to the housing for sensing the actuator element and for deenergizing the electrical motor when the rotor arrives in either the first position or second position.

Such a control valve can be operarated by a low voltage of 1.5 to 12 volts, and with about 90 to 190 milliwatts of power. This makes the control valve suitable for operation by long-life rechargeable batteries. While the power requirements in the novel control valve are thus much less than in the conventional-actuated valve, the required operational time is longer, from about 1.5 to 3 seconds, as compared to that required for solenoid-actuated valves. However, this longer time for actuation of the valve is not a significant factor in water irrigation systems, for example, and is more than compensated for by the substantially lower power requirements which makes the valves suitable for operation by small, rechargeable batteries.

According to another aspect of the present invention, therefore, there is provided a water distribution system, such as a water irrigation system, including a water distribution conduit, a distribution valve controlling distribution of water from the conduit, and a control valve as described above serving as a pilot valve for controlling the distribution valve. The charging device for recharging the battery may include a water turbine and generator rotated by the flow of water through the water distribution conduit, a wind turbine and generator rotated by the wind, or a solar cell converting solar energy to electrical energy.

The invention is particularly useful in field-installed water irrigation systems remotely controlled in a wireless manner by coded control signals transmitted from a transmitter located at a distance from the control valve.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

The Embodiment of FIGS. 1–5

Figure 1:
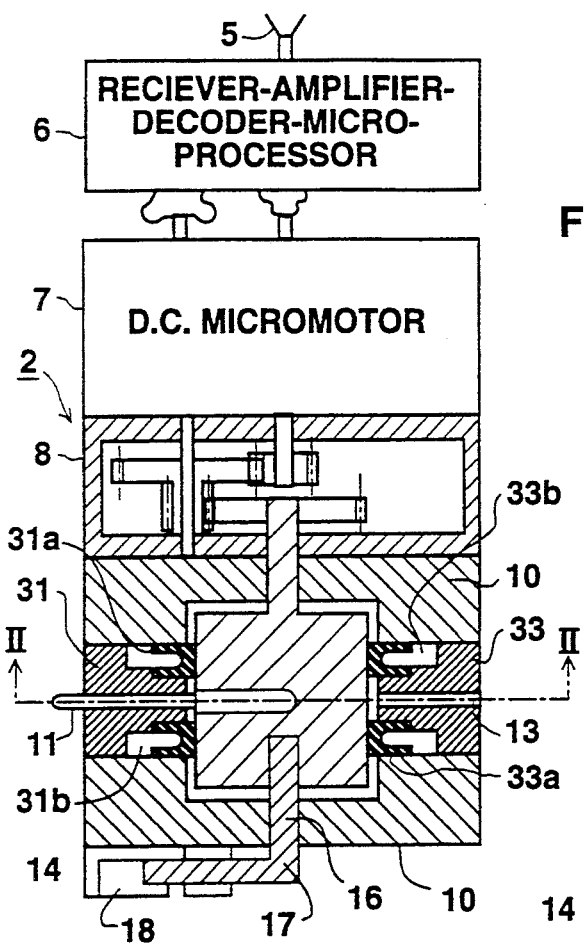
FIG. 1 illustrates one form of electrically-operated control valve constructed in accordance with the present invention, the control valve being shown in cross-section in its normally-closed condition.

The control valve 2 illustrated in FIGS. 1–5 is used as a pilot valve for controlling a water distribution valve 3 (FIG. 2) in a water distribution conduit 4, such as in a water irrigation system. The water distribution valve 3 is to be remotely controlled from a distance in a wireless manner by receiving coded signals via an antenna 5 of a receiver 6 at the location of the pilot valve 2. Receiver 6 amplifies and processes the received signals and controls a DC micromotor 7 which is coupled via a speed-reducer transmission 8 to the pilot valve 2.

Pilot valve 2 includes a housing 10 having an inlet port 11 and a control port 12 (FIG. 2) both connected to the water distribution conduit 4, as will be described more particularly below. Housing 10 includes a further port 13 serving as a vent leading to the atmosphere. A rotor 14 is rotatably mounted within housing 10 and is formed with a passageway 15. In one position of rotor 14 (FIG. 2), its passageway 15 connects pressure inlet port 11 to control port 12; and in a second position of the rotor (FIG. 5), its passageway 15 connects control port 12 to vent port 13.

Figure 3:
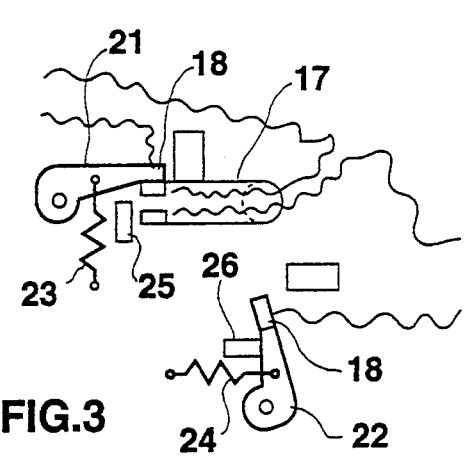
FIGS. 3 and 4 illustrate the two limit positions of an actuator element in the control valve of FIGS. 1 and 2 for electrically deenergizing the valve.
Figure 4:
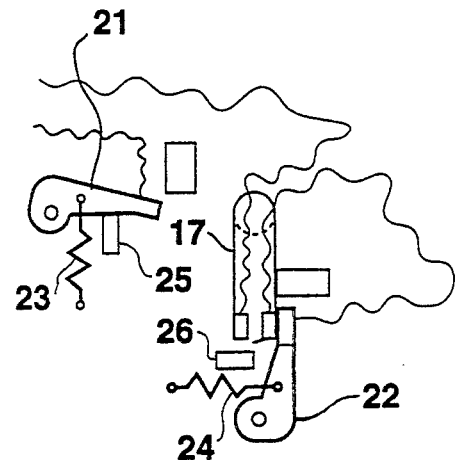

Rotor 14 is of cylindrical configuration and is rotatably mounted on a pair of trunnions 16. The rotor includes a projection 17, in the form of a laterally-extending bracket, engageable with a pair of limit switches 18 to deenergize the DC electrical motor 7 when the rotor has been rotated thereby to preset limit positions. As illustrated in FIGS. 3 and 4, the two limit switches 18 are located 90° apart, so that when the electric motor 7 is energized to rotate the rotor, the rotor will make a one-quarter revolution and will then automatically deenergize the electric motor.

As also illustrated in FIGS. 3 and 4, the pilot valve includes cushioning means for cushioning the rotor 14 as it reaches the end of the one-quarter revolution to avoid producing an abrupt stop. The latter cushioning means comprise a pair of pivotal levers 21, 22, at the two limit positions, each urged by a spring 23, 24 against a stop 25, 26. The levers are thus engageable by the bracket 17 as it approaches the respective limit position and cushion the movement of the bracket by stressing the respective springs 23, 24.

The three ports 11, 12, 13 are each formed through three gland housings 31, 32, 33 spaced 90° around rotor 14. For purposes of symmetry and balance, a fourth gland housing 34 is provided on the fourth side of the rotor. Gland housings 31, 32 and 33 include sealing glands 31a, 32a, 33a, respectively, around their respective ports 11, 12, 13. Gland housing 34 also includes a sealing gland 34a. One side of each sealing glands 31a–34a is pressed against the outer face of the cylindrical rotor 14. The opposite side of each sealing gland is connected to the inlet port 11 by a U-shaped channel 31b–34b in each sealing gland housing, and by passageways 35 connecting these channels in series to the inlet port 11. Channels 35 may be produced by drilling bores through housing 10 and then applying plugs 36 to plug the outer ends of the bores. Such a construction provides a symmetrical and balanced sealing arrangement with respect to rotor 14.

Figure 2:
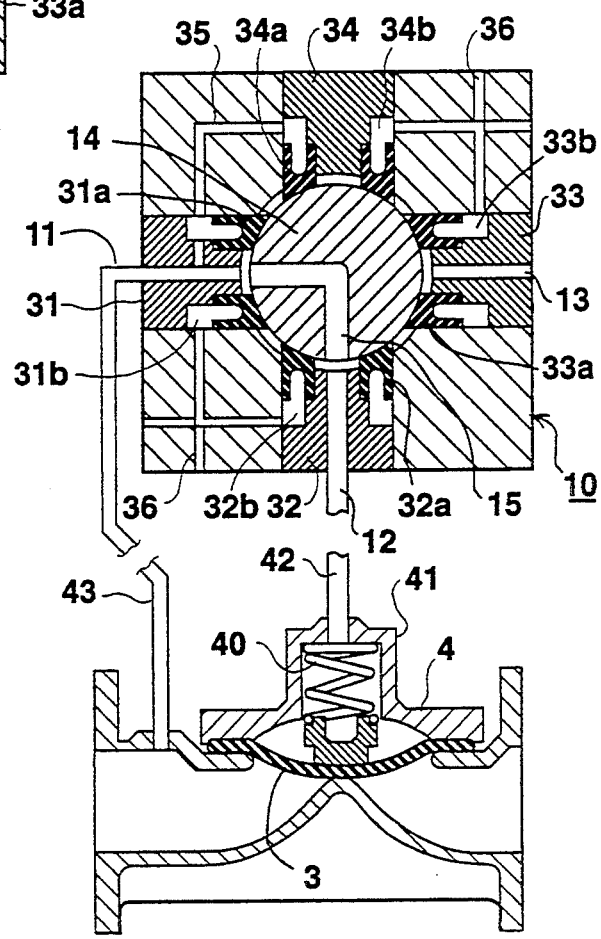
FIG. 2 is a transverse sectional view of the control valve of FIG. 1 along line II—II as used as a pilot valve for controlling a water distribution valve in a water distribution system.

FIG. 2 illustrates how the pilot valve 2 is used for controlling the distribution valve 3 in the distribution conduit 4 in, for example, a water irrigation system. Distribution valve 3 is a diaphragm valve which is normally urged to the closed position illustrated in FIG. 2 by a spring 40. The latter spring is within a control chamber 41 connected to the control port 12 of the pilot valve 2 by a tube 42. The inlet port 11 of the pilot valve is connected by a tube 43 to the distribution conduit 4 upstream side of the diaphragm valve 3.

The arrangement is such that when rotor 14 of the pilot valve 2 is in the position illustrated in FIG. 2, the pressure of the water within distribution conduit 4 upstream of the diaphragm valve 3 is applied via tube 43, inlet port 11, passageway 15, and control port 12, to the interior of control chamber 41, thereby balancing the same pressure applied to the opposite side of diaphragm 3 directly from the inlet of distribution conduit 4; spring 40 is thus effective to move diaphragm 3 to its closed position as shown in FIG. 2. However, when rotor 14 is rotated to the position illustrated in FIG. 5, the interior of control chamber 41 is vented to the atmosphere via tube 12, passageway 15 of the pilot valve rotor 14, and venting port 13, so that the inlet pressure applied to the diaphragm is sufficient to overcome the force of spring 40 and thereby to move the diaphragm to its open position.

The operation of the system illustrated in FIGS. 1–5 will be apparent from the above description. Thus, rotor 14 in the pilot valve 2 is normally in the position illustrated in FIG. 2, wherein its passageway 15 connects inlet port 11 to control port 12, thereby applying the inlet pressure of distribution conduit to the interior of control chamber 41. As described earlier, the same inlet pressure is applied to the opposite side of diaphragm 3, and therefore spring 40 within control chamber 41 will be effective to move diaphragm valve 3 to the closed position as illustrated in FIG. 2.

When it is desired to open the diaphragm valve 3 in order to initiate an irrigation operation, a coded signal is transmitted in a wireless manner from a central station (not shown) and is received by antenna 5 of the receiver 6 for that particular installation. This coded signal is processed by the receiver and is used to energize electrical motor 7 which is coupled by the speed-reducer transmission 8 to rotor 14 of the pilot valve 2.

Rotor 14 is thus rotated by motor 7 via speed-reducer 8. As rotor 14 rotates, its projecting bracket 17 also rotates until it engages one limit switch 18 (FIGS. 3, 4), located 90° with respect to the other limit switch 18, thereby deenergizing the electrical motor. As bracket 17 approaches this limit, it engages pivotal lever 22 which, via its spring 24, cushions the bracket 17, and thereby rotor 14, to a full stop at this limit position.

Figure 5:
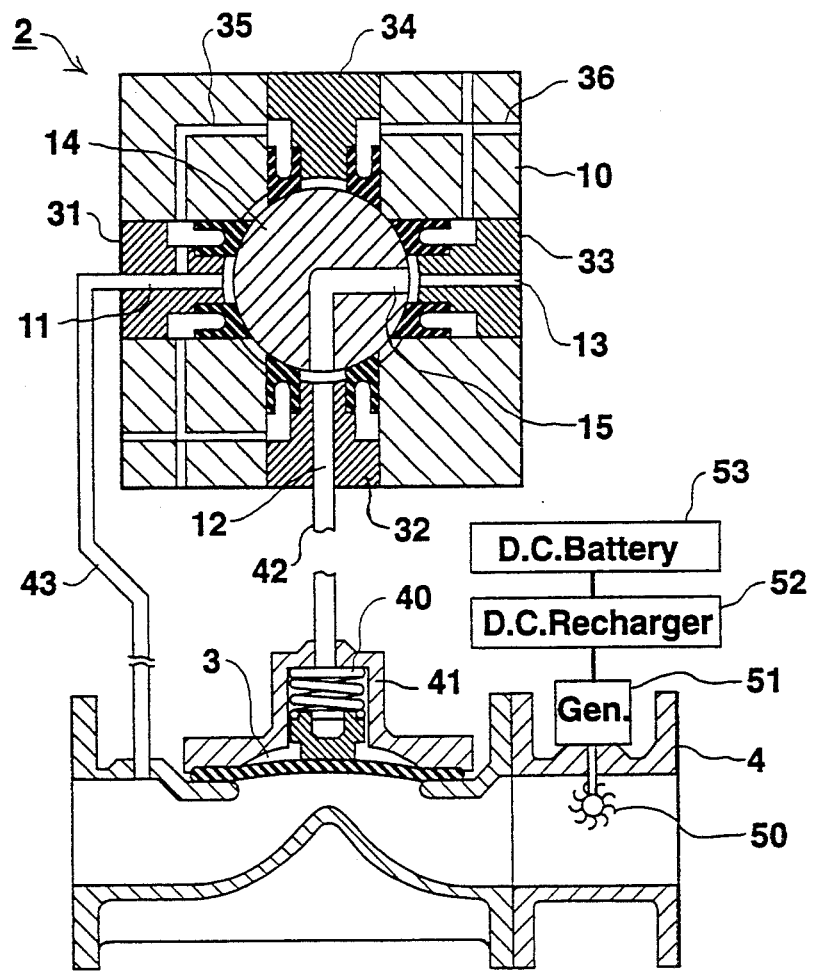
FIG. 5 is a view similar to that of FIG. 2 but showing the open position of the control valve and of the water distribution valve.

This rotation of rotor 14 one-quarter revolution brings it to the position illustrated in FIG. 5, wherein its passageway 15 is now aligned with ports 12 and 13 of the pilot valve housing. In this position of the rotor, the interior of control chamber 41 of diaphragm valve 3 is now vented to the atmosphere via control port 12 and venting port 13. Accordingly, the inlet pressure applied to the distribution conduit 4 is sufficient to overcome spring 40 and to move the diaphragm valve 3 to the open position as illustrated in FIG. 5.

The speed-reducer 7 substantially reduces the speed, and thereby substantially increases the torque, applied by motor 7 to the pilot valve rotor 14. Accordingly, very little power is required from the electric motor to rotate the pilot valve rotor. As one example, the rotor may be rotated by a battery having a low voltage of 1.5 to 12 volts, with a current of 10 to 90 milliamps, such as to require about 90 to 180 milliwatts of output power. This low amperage requirement enables the use of very small and compact motors operated by long-life batteries. The system is thus particularly useful for remotely-controlled, wireless-operated water irrigation systems, as compared to the conventional solenoid-actuated controls now used in such systems. Although the illustrated system involves a delay of about 1.5 to 3 seconds for operating the main discharge valve (3), whereas a solenoid-controlled system operates almost instanteously, such a delay in the operation of the main discharge valve is not a significant factor in a water irrigation system and therefore does not detract from its use in such a system.

In order to increase the useful life of the battery for operating the motor, the battery is preferably automatically rechargeable in the field. One way of accomplishing this is to provide solar cells in the field for recharging the battery. FIG. 5 illustrates another way of doing this, namely by providing a water turbine 50 at the outlet end of the distribution conduit 4, which turbine is rotated by the flow of the water through the conduit. Turbine 50 is connected to a generator 51 whose output is supplied to a recharger 52 for recharging the battery 53 operating the motor 7.

Figure 15:
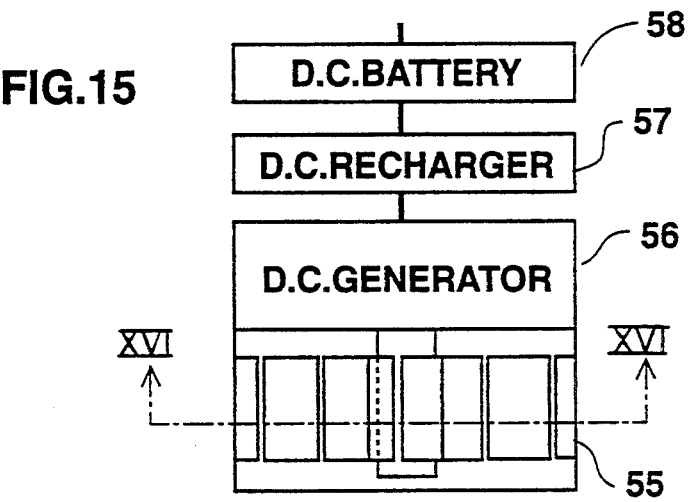
FIG. 15 diagrammatically illustrates a wind turbine for recharging the battery power supply for the above-described pilot valves.
Figure 16:
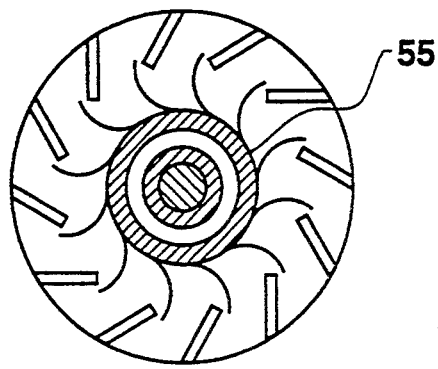
FIG. 16 is a sectional view along line XVI—XVI of FIG. 15.

FIGS. 15 and 16 illustrate another arrangement for periodically recharging the battery. In the arrangement illustrated in FIG. 15, a wind turbine 55, at the site of the pilot valve and driven by the wind, is used to drive a generator 56 whose output is applied to a recharger 57 for recharging the battery 58.

The System of FIGS. 6–14

The system illustrated in FIGS. 6–14 includes a water distribution conduit 60 (e.g., FIGS. 6, 7) having a floodgate 61 slidable over an opening 61a by a piston 62 movable within a cylinder 63. Piston 62 is controlled by a pilot valve 64 constructed in accordance with the present invention. Thus, pilot valve 64 is remotely controlled by coded signals transmitted in a wireless manner and received via an antenna 65 (e.g., FIG. 8) of a receiver 66 at the location of the water distribution system. Receiver 66 controls a DC electrical motor 67 coupled to the pilot valve 64 via a speed-reducer transmission 68.

Figure 8:
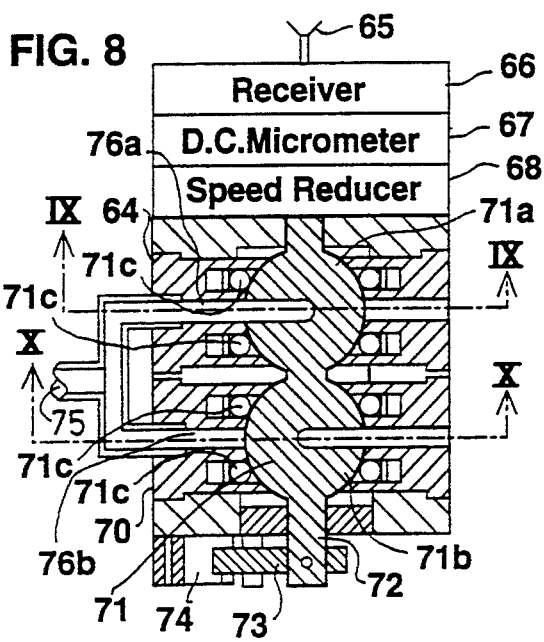
FIG. 8 is a cross-sectional view along line VIII—VIII of FIG. 7 illustrating the pilot valve in the water distribution system of FIG. 6 with the main valve in its open condition.
Figure 9:
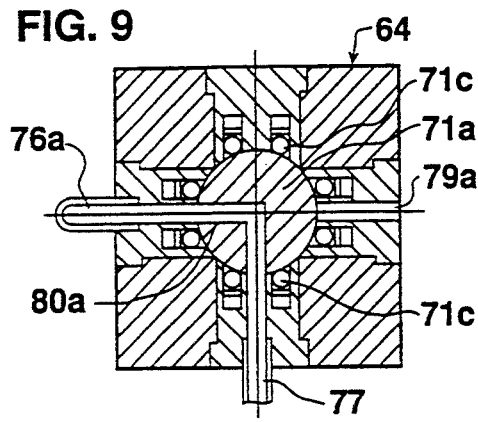
FIGS. 9 and 10 are sectional views along lines IX—IX and X—X of FIG. 8.
Figure 10:
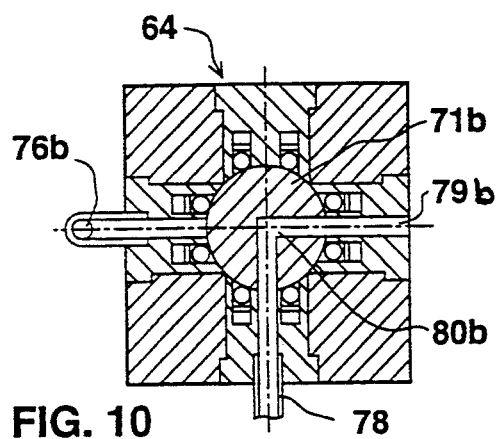

As shown particularly in FIGS. 8–10, the pilot valve 64 includes a housing 70 having a rotor 71 rotatably mounted within the housing and driven by the electrical motor 67 via speed-reducer 68. Rotor 71 is constituted of two spherical sections 71a, 71b, joined together in side-by-side relation and rotatable about an axis common to both sections. The two spherical rotor sections 71a, 71b, are sealed with respect to the housing 70 by means of a pair of sealing rings 71c on each side of each of the two rotor sections. Rotor 71 is rotatably mounted on trunnions 72 and carries a projecting bracket 73 cooperable with limit switches 74 to deenergize the electrical motor 67 when the rotor has completed a one-fourth rotation, as described above with respect to the embodiment of FIGS. 1–5.

The illustrated system includes a tube 75 (FIG. 6) connected to an inlet port 76a, 76b, to each of the two rotor sections 71a, 71b. Rotor section 71a includes a control port 77 (FIG. 9), whereas rotor section 71b includes a control port 78 (FIG. 10). In addition, both sections include venting ports 79a, 79b (FIG. 8), leading to the atmosphere, and passageway 80a, 80b connecting the above ports.

Figure 6:
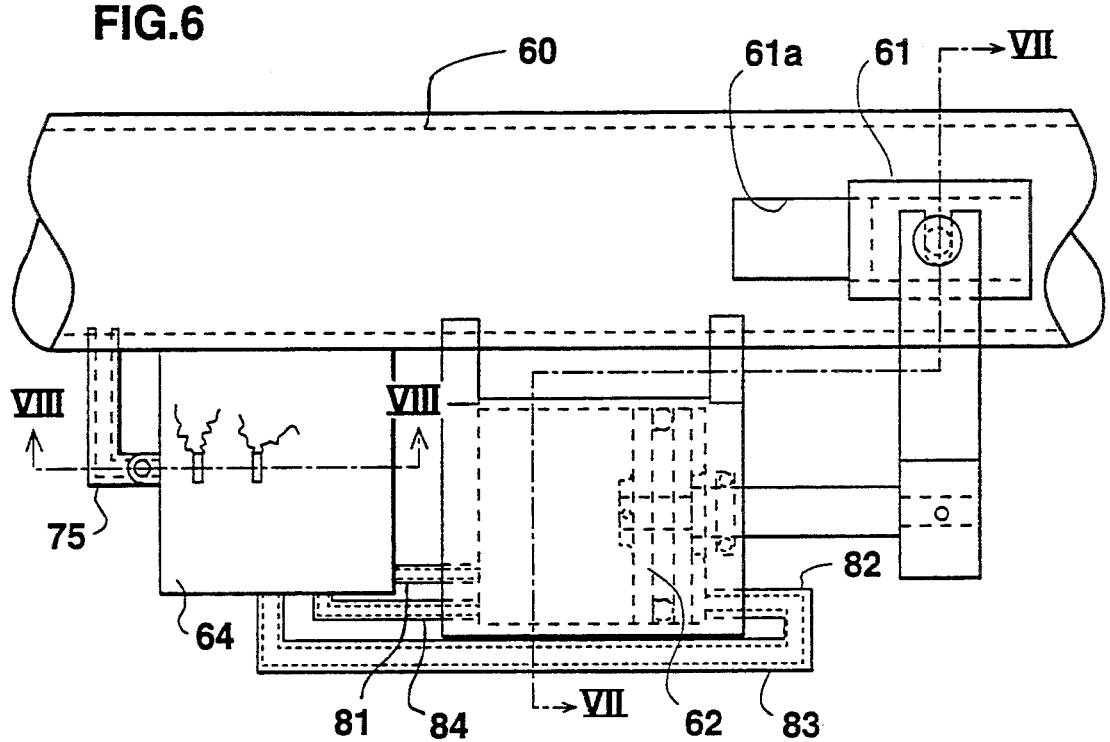
FIG. 6 illustrates a second water distribution system controlled by a pilot valve constructed in accordance with the present invention.
Figure 7:
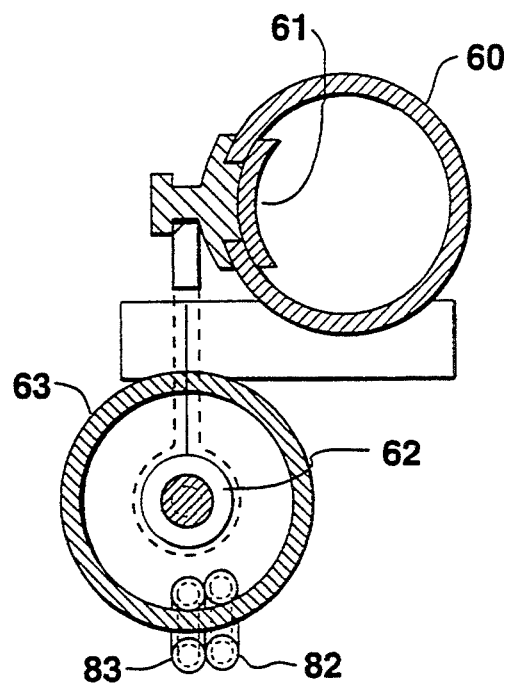
FIG. 7 is a transverse sectional view along line VII—VII of FIG. 6.

The above ports in the pilot valve are connected to cylinder 62 to open and close the slidable floodgate 61 with respect to opening 61a, as follows:

In order to move the slidable floodgate 61 to its open condition as illustrated in FIG. 6, the pilot valve rotor 71 is rotated to the position illustrated in FIGS. 8–10. In this position, the water pressure within the distribution conduit 60 is transmitted via tube 75 to the two inlet ports 76a, 76b. Passageway 80a (FIG. 9) within rotor section 71a connects inlet port 76a via control port 77 and tube 81 to the left side of cylinder 62, and passageway 80b in rotor section 71b connects control port 78 at the opposite side of the cylinder via tube 82 to the venting port 79b. Accordingly, the pressure within the distribution conduit 60 moves piston 63 rightwardly within cylinder 62, to the position shown in FIG. 6, causing the slidable floodgate 61 to slide to its open position with respect to opening 61a.

Figure 12:
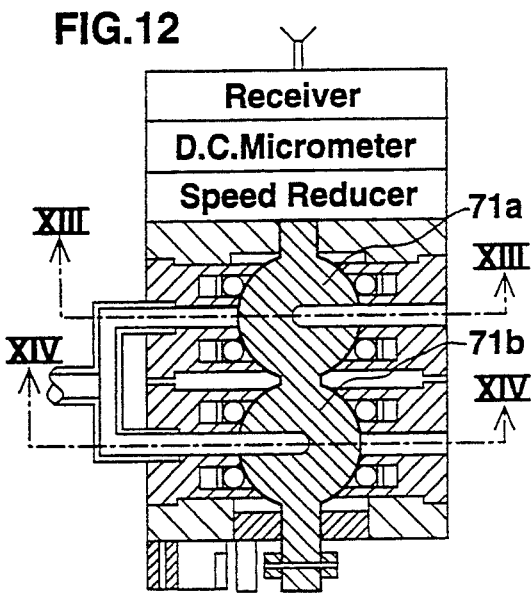
FIG. 12 is a sectional view along line XII—XII of FIG. 11 illustrating the pilot valve in a second position closing the main valve.
Figure 13:
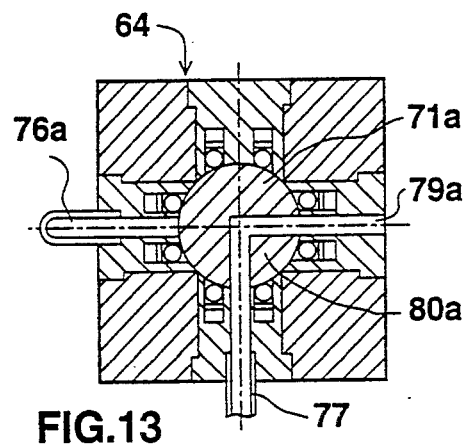
FIGS. 13 and 14 are sectional views along lines XIII—XIII and XIV—XIV of FIG. 12, respectively.
Figure 14:
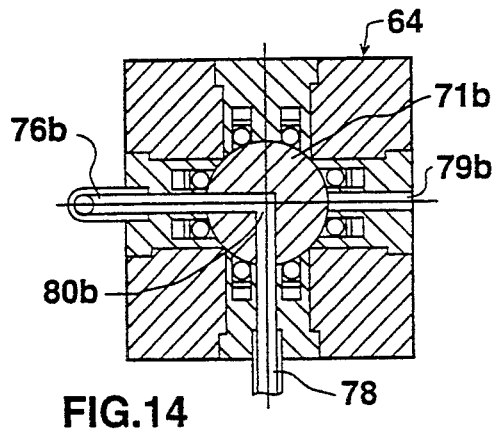
Figure 11:
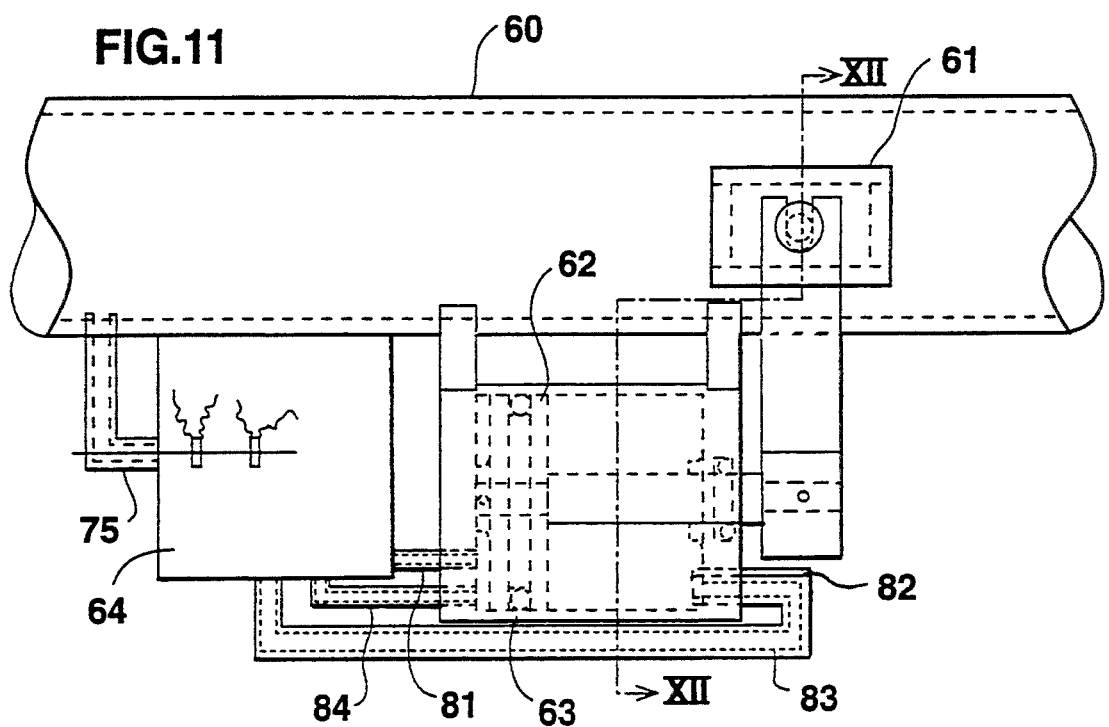
FIG. 11 illustrates another pilot valve construction.

To move the floodgate 61 to its closed position with respect to opening 61a, the pilot valve rotor 71 is rotated one-quarter revolution to the position illustrated in FIGS. 12–14. In this position, the high water pressure is now applied via inlet port 76b (FIG. 14) and control port 78 via tube 83 to the opposite side of cylinder 63, whereas control port 77 connected to the left side of cylinder 62 via tube 84 is now connected via the passageway 80a in rotor section 71a to the vent port 79a. This causes piston 63 to move to the left side of cylinder 62, as shown in FIG. 11, to move gate 60 to close opening 61a in conduit 60.

The distribution system illustrated in FIGS. 6–14 also includes a rechargeable battery for energizing the electrical motor 67. Such a system could also therefore use the various arrangements described with respect to the system of FIGS. 1–5 for recharging the battery.

While the invention has been described with respect to two preferred embodiments, it will be appreciated that these are set forth merely for purposes of example, and that many other variations, modifications and applications of the invention may be made.

What is claimed is:

1. An electrically-operated control valve, comprising:

a valve housing having a fluid inlet port, a control port, and a venting port;

a rotor formed with a passageway therethrough rotatably mounted within said housing to a first position connecting said control port to said inlet port via said passageway, or to a second position connecting said control port to said venting port;

an electrical rotary motor for rotating said rotor;

a rechargeable battery for energizing said electrical motor;

a rotary position sensor for sensing the position of said rotor and for deenergizing the electrical motor when the rotor arrives in either said first position or second position;

said rotary position sensor including a projection carried by said rotor so as to rotate therewith, and a plurality of limit switches fixed to said housing actuated by said projection for deenergizing the electrical motor when said rotor arrives in either said first position or second position, respectively;

cushioning elements engageable by said projection at said first position and second position of the rotor for cushioning the stopping of said rotor;

and a charging device for recharging said battery.

2. The control valve according to claim 1, wherein said electrical motor is coupled to said rotor via a speed-reducing, torque-increasing transmission.

3. The control valve according to claim 1, wherein said cushioning elements include a spring-urged pivotal lever at each of said first position and second position and engageable by said projection of the rotor.

4. The control valve according to claim 1, wherein said rotor is rotatably mounted to said housing by a pair of trunnions.

5. An electrically-operated control valve, comprising:
a valve housing having a fluid inlet port, a control port, and a venting port;
a rotor formed with a passageway therethrough rotatably mounted within said housing to a first position connecting said control port to said inlet port via said passageway, or to a second position connecting said control port to said venting port;
an electrical rotary motor for rotating said rotor;
and a rotary position sensor for sensing the position of said rotor and for deenergizing the electrical motor when the rotor arrives in either said first position or second position;
said rotor being of cylindrical configuration, and said housing including a plurality of sealing glands symmetrically disposed around the circumference of the rotor with one of the sides of said sealing glands contacting said rotor, and the opposite sides of said sealing glands all connected to said inlet port of the rotor.

6. The control valve according to claim 5, wherein each of said sealing glands is located in a gland housing formed with a U-shaped channel at said opposite sides of the respective sealing gland, all said U-shaped channels being connected to said inlet port of the rotor.

7. The control valve according to claim 6, wherein said housing includes four pairs of said sealing glands spaced 90° apart around the circumference of the rotor.

8. An electrically-operated control valve, comprising:
a valve housing having a fluid inlet port, a control port, and a venting port;
a rotor formed with a passageway therethrough rotatably mounted within said housing to a first position connecting said control port to said inlet port via said passageway, or to a second position connecting said control port to said venting port;
an electrical rotary motor for rotating said rotor;
and a rotary position sensor for sensing the position of said rotor and for deenergizing the electrical motor when the rotor arrives in either said first position or second position;
said rotor including two sections joined together in side-by-side relation and rotatable about an axis common to both said sections.

9. The control valve according to claim 8, wherein said two rotor sections are spherical, and said housing includes a sealing ring on each of two opposite sides of each spherical rotor section and coaxial with said common axis.

10. A water distribution system, comprising:
a water distribution conduit;
a distribution valve within said water distribution conduit for controlling the distribution of water therethrough;
and an electrically-operated control valve serving as a pilot valve for controlling said distribution valve; said control valve comprising:
a valve housing having a fluid inlet port a control port, and a venting port;
a rotor formed with a passageway therethrough rotatably mounted within said housing to a first position connecting said control port to said inlet port via said passageway, or to a second position connecting said control port to said venting port;
an electrical rotary motor for rotating said rotor;
a rechargeable battery for energizing said electrical motor;
a rotary position sensor for sensing the position of said rotor and for deenergizing the electrical motor when the rotor arrives in either said first position or second position;
and a charging device for recharging said battery;
said distribution valve including a diaphragm movable to an open position or to a closed position, and a control chamber for controlling said diaphragm;
said control chamber being connected to said pilot valve such that the pilot valve controls the pressure in said control chamber and thereby the actuation of said distribution valve.

11. The water distribution system according to claim 10, wherein said charging device includes a water turbine and generator rotated by the flow of water through said water distribution conduit for recharging said battery.

12. The water distribution system according to claim 10, wherein said charging device includes a wind turbine and generator rotated by the wind for recharging said battery.

13. The water distribution system according to claim 10, wherein said charging device includes a solar cell converting solar energy to electrical energy for recharging said battery.

14. The water distribution system according to claim 13, wherein said diaphragm is urged by a spring to a closed position but is subjected on one side to the inlet port pressure tending to move the diaphragm to an open position;
the pressure in said control chamber being applied to the opposite side of said diaphragm;
said pilot valve being effective in one position to apply the inlet port pressure to said control chamber such that the spring closes the distribution valve, and in a second position to vent the control chamber to the atmosphere such that the inlet port pressure opens the distribution valve.

15. A water distribution system, comprising:
a water distribution conduit;
a distribution valve within said water distribution conduit for controlling the distribution of water therethrough;
and an electrically-operated control valve serving as a pilot valve for controlling said distribution valve; said control valve comprising:
a valve housing having a fluid inlet port, a control port, and a venting port;
a rotor formed with a passageway therethrough rotatably mounted within said housing to a first position connecting said control port to said inlet port via said passageway, or to a second position connecting said control port to said venting port;
an electrical rotary motor for rotating said rotor;

a rechargeable battery for energizing said electrical motor;

a rotary position sensor for sensing the position of said rotor and for deenergizing the electrical motor when the rotor arrives in either said first position or second position;

and a charging device for recharging said battery;

said distribution valve including a piston movable within a cylinder by said pilot valve, and a floodgate within said distribution conduit movable to an open position or a closed position by the movement of said piston within the cylinder.

16. The water distribution system according to claim 10, further including a wireless receiver having an antenna receiving coded control signals from a remotely-located transmitter for controlling said pilot valve.

* * * * *